Aug. 21, 1956 J. C. LOZIER 2,760,007
TWO-STAGE TRANSISTOR FEEDBACK AMPLIFIER
Filed Aug. 6, 1953
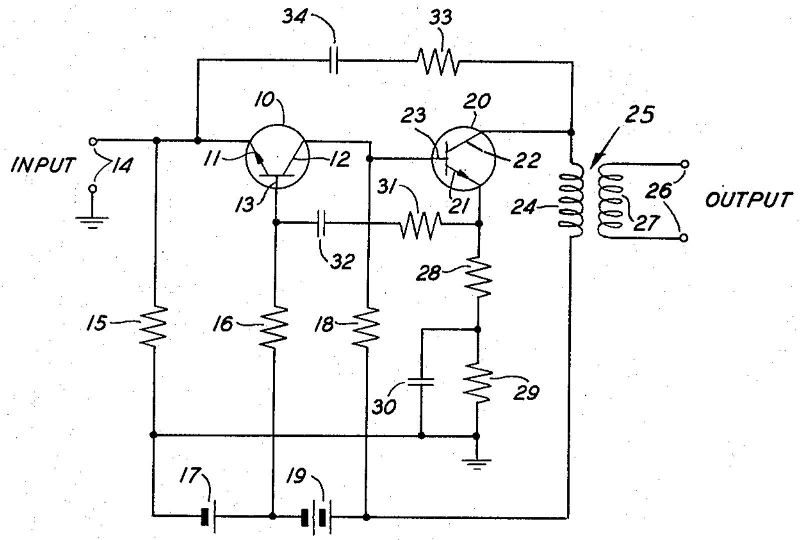
INVENTOR
J. C. LOZIER
BY N. S. Ewing
ATTORNEY

United States Patent Office 2,760,007

Patented Aug. 21, 1956

2,760,007

TWO-STAGE TRANSISTOR FEEDBACK AMPLIFIER

John C. Lozier, Short Hills, N. J., assignor to Bell Telephone Laboratories, Incorporated, New York, N. Y., a corporation of New York Application August 6, 1953, Serial No. 372,764

4 Claims. (Cl. 179—171)

This invention relates generally to wide-band multistage transistor amplifiers and more particularly to wide-band multistage amplifiers employing transistors of the junction type.

A principal object of the invention is to extend the advantages of reduced power consumption and maintenance afforded by the use of transistors to the carrier-telephone-repeater amplifier field.

A related object is to produce a substantial amount of gain in a multistage transistor amplifier over the wide range of frequencies required for carrier telephone operation.

Another object is to stabilize the input and output impedances as well as the gain of a wide-band multistage transistor amplifier in as simple a manner as possible.

In a carrier telephone system, the operating requirements imposed upon a repeater amplifier are relatively severe. While the overall gain required from such an amplifier is a function of both repeater spacing and the gauge of the cable used for transmission, an insertion gain of approximately 20 db at a level of of +10 dbm is a typical requirement. Furthermore, the frequency range over which such gain must be maintained accurately is typically of the order of from 10 to 100 kilocycles. Other important limitations imposed upon a repeater amplifier intended for use in a carrier telephone system are that its input and output impedances should be of substantially the same level as the impedance of the other important system components and that these impedances must be substantially without variation over the entire operating frequency range of the amplifier. Since the impedance level of such system components as cables, filters, and hybrids is typically of the order of 600 ohms, it is desirable that the input and output impedances of an amplifier intended to be associated with such elements also be stabilized at substantially 600 ohms.

Through the use of feedback techniques, these requirements have been met in the vacuum-tube amplifier field. The advent of the transistor, however, has made it desirable to provide transistor amplifiers which meet the same rigid requirements. Since two principal contributors to the operating expenses of a carrier telephone system are power consumption and maintenance, transistors are peculiarly constituted to aid in the reduction of such costs. Considerably lower power drain should be realized with transistor circuits and reduced maintenance should result, due principally to the longer life expected from transistors and batteries. Known vacuum-tube circuits cannot, however, be readily adapted for use with transistors because the inherent properties of transistors present unique problems which are not encountered in vacuum-tube feedback amplifier design.

A principal problem presented by transistors is the marked tendency of collector current to decrease with an increase in frequency. In the transistor circuit configurations which provides the greatest amount of gain, a 6 db per octave asymptotic cut-off begins within or near the frequency range of interest in carrier telephone applications. For a two-stage amplifier, two such collector current cut-off characteristics may give a phase shift approximating 180 degrees within or near the desired transmission band. This leads to increased amplifier complexity for broad-band feed-back amplifiers if both high gain and adequate stability margins are to be maintained.

In its principal embodiment, the present invention takes the form of a simple two-stage wide-band transistor feedback amplifier suitable for use in a repeatered carrier telephone system. It meets the rigid standards of performance required for such use and enables both the peculiar advantages of transistor circuits and many of the well-known advantages of existing vacuum-tube circuits to be realized. Furthermore, it overcomes those particular problems which the application of transistors to such uses tends to present.

A principal embodiment of the invention comprises a first transistor stage of the so-called common base (sometimes referred to as grounded base) configuration combined with a second transistor stage of the so-called common emitter (sometimes referred to as grounded emitter) configuration to give the desired impedance, gain, and band-width characteristics. These are further enhanced and stabilized by the combination of a series feedback path which includes a connection from the emitter of the second stage to the base of the first with a shunt feedback path which includes a connection from the collector of the second stage to the emitter of the first.

A more complete understanding of the invention may be obtained from a study of the following detailed description of the specific embodiment illustrated in the drawing.

The two-stage transistor feedback amplifier illustrated in the drawing includes a first transistor 10 having an emitter electrode 11, a collector electrode 12, and a base electrode 13, and a second transistor 20 having an emitter electrode 21, a collector electrode 22, and a base electrode 23. In the conventional symbols used for transistors 10 and 20, each emitter electrode is indicated by an arrow and the direction of positive emitter current flow is indicated by the direction of the arrow. Thus, since its emitter current normally flows away from the base into the emitter, a junction transistor of the n-p-n type (described, for example, in the article "Some circuit properties and applications of n-p-n transistors" by R. L. Wallace, Jr., and W. J. Pietenpol, appearing at page 530 of the July 1951 issue of The Bell System Technical Journal and at page 753 of the July 1951 issue of the Proceedings of the I. R. E.) is represented by a symbol in which the emitter arrow points away from the base. For convenience, the conventional transistor symbol used in the drawing has the emitter arrow pointing away from the base, and all battery polarities are chosen for the indicated direction of emitter current flow. The illustrated embodiment of the invention is not, however, limited to transistors of the n-p-n type. For emitter current flow in the opposite direction, battery polarities are reversed from those illustrated in the drawing.

In the drawing, transistor 10 and its associated elements constitute a stage of the common base configuration (so-called because the transistor base electrode is common to both the signal input and the signal output paths of the stage). One of a pair of amplifier input terminals 14 is connected directly to emitter electrode 11 while the other is connected to ground. An emitter biasing resistance 15 is connected between the emitter electrode 11 and ground, and a base resistance 16 is connected between base electrode 13 and the positive terminal of a D.-C. emitter biasing source 17. Source 17, which is poled to bias emitter electrode 11 in the forward direction, has its negative terminal grounded. A resistance 18, serving to supply direct operating potentials to both collector electrode 12 and base electrode 23, is connected between collector electrode 12 and the positive terminal of a D.-C. collector biasing source 19. Source 19, which is poled to bias collector electrode 12 in the reverse direction, has its negative terminal connected directly to the positive terminal of source 17.

The second transistor 20 and the elements associated with it constitute a stage of the common emitter configuration (so-called because the transistor emitter electrode is common to both the signal input and signal output paths of the stage). The collector electrode 12 of transistor 10 is directly connected to the base electrode 23 of transistor 20, and the collector electrode 22 of transistor 20 is connected to the positive terminal of source 19 through the primary winding 24 of an amplifier output transformer 25. Two resistances 28 and 29 are connected in series between emitter electrode 21 and ground, and the one more remote from emitter electrode 21, resistance 29, is bypassed to ground by a condenser 30.

The two-stage transistor amplifier illustrated in the drawing is provided with two mutually cooperating negative feedback paths. A series feedback path (so-called because part of the output voltage is fed back in series with the input signal voltage) is provided by a resistance 31 and a coupling condenser 32 connected in series between emitter electrode 21 of transistor 20 and base electrode 13 of transistor 10. A voltage proportional to that developed across resistance 28 is developed across resistance 16 in the base circuit of transistor 10 to provide the desired feedback effect. A shunt feedback path (so-called because the output voltage is fed back to a shunt combination of the passive input impedance of the amplifier and the output impedance of any source of signals connected thereto) is provided by a resistance 33 and a coupling condenser 34 connected in series between the collector electrode 22 of transistor 20 and the emitter electrode 11 of transistor 10. Here, the fed back voltage is developed across the parallel combination of resistance 15 and the input impedance of the amplifier.

A common base circuit configuration is used for the first stage of the illustrated embodiment of the invention for a number of reasons. In the first place, it is the only one of the three basic transistor circuit configurations in which the circuit cut-off frequency (i. e., the frequency at the high end of the spectrum at which the circuit current gain factor is down 3 db from its low frequency value) is not reduced substantially below the $\alpha$ cut-off frequency of the transistor.

In general, the transistor current amplification factor $\alpha$ (the approximate current gain from emitter to collector) is substantially constant at low frequencies and then decreases with increasing frequency. To a first approximation in the carrier frequency range $$\alpha = \frac{\alpha_0}{1 + j\frac{f}{f_0}} \quad (1)$$

where $\alpha_0$ is the low frequency value of $\alpha$, $f$ represents frequency, and $f_0$ is the frequency (transistor $\alpha$ cut-off frequency) at which $\alpha$ is down 3 db from its low frequency value.

The common base circuit configuration, at least to a first approximation, has the same circuit current gain as the transistor which it employs. Thus, the ratio of output current to input current (i. e., collector current to emitter current) is substantially $$\frac{i_{OUT}}{i_{IN}} \cong \alpha = \frac{\alpha_0}{1 + j\frac{f}{f_0}} \quad (2)$$

where $\alpha$ is the transistor current amplification factor defined above. The common emitter and common collector configurations, however, alter this situation to an appreciable degree. For a common emitter configuration using a junction transistor, a ratio of output current to input current (i. e., collector current to base current, assuming the base electrode to be used as the input electrode) is substantially $$\frac{i_{OUT}}{i_{IN}} \cong -\frac{\alpha}{1-\alpha} = -\frac{\alpha_0}{(1-\alpha_0) + j\frac{f}{f_0}} \quad (3)$$

A common collector circuit using a junction transistor has a ratio of output current to input current (i. e., emitter current to base current, again assuming the base electrode to be used as the input electrode) of substantially $$\frac{i_{OUT}}{i_{IN}} \cong \frac{1}{1-\alpha} = \frac{1 + j\frac{f}{f_0}}{(1-\alpha_0) + j\frac{f}{f_0}} \quad (4)$$

From Expressions 2, 3, and 4, it is evident that, when expressed in db and plotted as a function of frequency, the current gain factor on all three basic transistor circuit configurations decreases in a well-defined manner in the carrier frequency range once the circuit cut-off frequency has been exceeded. The slope or high frequency asymptote of this decrease is approximately 6 db per octave. Associated with each such asymptote is an ultimate phase shift of 90 degrees which begins much lower in the frequency spectrum than the slope itself.

In the common emitter and common collector configurations, the asymptotic slope of 6 db per octave begins at a much lower frequency in the carrier frequency range than it does in the common base configuration. In the common base configuration, the circuit cut-off frequency is substantially the same as the transistor $\alpha$ cut-off frequency $f_0$, while in the common emitter and common collector configurations, the circuit cut-off frequency is reduced to $f_0(1-\alpha_0)$. Thus, while the current gain factors available from common emitter and common collector stages are considerably greater than those obtainable from common base stages, the band-widths are increasingly reduced.

The reduction in circuit band-width encountered in common emitter and common collector transistor amplifier stages makes it extremely difficult to apply an appreciable amount of feedback around even two stages in a multistage amplifier. Above the circuit cut-off frequency of both stages in a two-stage common emitter or common collector transistor amplifier, there can easily be a phase shift approaching 180 degrees. When this amount of phase shift occurs in the carrier frequency band, the overall gain must be reduced well below unity for stability against self-oscillation.

One of the numerous features of the present invention is the use of a common base input stage in combination with a common emitter output stage, with multiple feedback paths of a particular type from the output of the latter to the input of the former. The common base input stage has a number of advantages. In the first place, since its current gain factor depends directly upon $\alpha$, the high frequency asymptote begins well beyond the carrier frequency band at the transistor $\alpha$ cut-off frequency $f_0$ and the associated phase shift does not begin until the upper edge (i. e., the highest frequencies) of the carrier frequency band. In the second place, the common base stage has a low input impedance suitable for association with other carrier system impedances, and the variation with frequency of its input impedance can readily be overcome by series feedback. Finally, the common base stage acts as a current source for the following stage, since its output impedance is of the same order of magnitude as its collector impedance, and any variation in the input impedance of the second stage will not cause undue distortion.

In the illustrated embodiment of the invention, the second stage is of the common emitter configuration in order to secure the high gain required for carrier telephone repeater applications. It has a high input impedance which is enhanced by the presence of resistance 28 in the emitter circuit. Resistance 28 introduces a local series feedback path which increases this input impedance sufficiently to make the stage suitable for use in connection with the high output impedance of the common base stage. While the output impedance of the common emitter stage is high, the turns ratio of the amplifier output transformer 25 serves to reduce the amplifier output impedance to the low level required for coupling the circuit to the other common elements of a carrier telephone system.

There is no turnover in phase between the collector electrode 12 of transistor 10 and the emitter electrode 21 of transistor 20, and series feedback is provided directly from emitter electrode 21 to the base electrode 13 of transistor 10. The equivalent load resistance in the collector circuit of the common emitter input stage is small in comparison with the internal collector resistance of transistor 10 and the currents flowing in emitter 21 and collector 22 are substantially equal. For this reason, the current flowing in emitter resistor 28 is an accurate representation of the load current of the amplifier and the series feedback through resistance 31 to the base resistor 16 of the first stage effectively provides overall feedback from the output to the input of the amplifier. This feedback is negative since the fed back voltage between the base and emiter electrodes of the first stage is opposite in phase from any amplifier input signal voltage.

Because of the phase reversal between the base and collector electrodes of transistor 20, shunt feedback is applied from the amplifier output back to the amplifier input through the series combination of resistance 33 and coupling condenser 34, as shown in the drawing. The fed back voltage is developed across the parallel combination of resistance 15 and the input impedance of the amplifier. This feedback is also negative and cooperates with the series feedback through resistance 31 further to stabilize the operating characteristics of the amplifier. Both the input and the output impedances of the amplifier are held substantially constant throughout the carrier frequency band by the interaction of these two feedback paths and are maintained at a low level of the same order of magnitude as the other impedances with which a repeater amplifier is comonly associated in a carrier telephone system. In addition, the two feedback paths cooperate to maintain the gain of the amplifier at a substantially constant level over the entire carrier frequency range.

By way of illustration, the following specific values are given as typical of those which may be used in the embodiment of the invention illustrated in the drawing:

| | |
|---|---|
| Transistor **10** | M1752 n-p-n type. |
| Resistance **15** | 10,000 ohms. |
| Resistance **16** | 330 ohms. |
| Battery **17** | 2.5 volts. |
| Resistance **18** | 50,000 ohms. |
| Battery **19** | 25 volts. |
| Transistor **20** | M1752 n-p-n type. |
| Transformer **25** | 10:1 turns ratio. |
| Resistance **28** | 600 ohms. |
| Resistance **29** | 1800 ohms. |
| Condenser **30** | 4 microfarads. |
| Resistance **31** | 300 ohms. |
| Condenser **32** | 4 microfarads. |
| Resistance **33** | 25,000 ohms. |
| Condenser **34** | 4 microfarads. |

With such circuit elements, the illustrated amplifier has an insertion gain of 20 db (within ±0.5 db over the carrier frequency range), a power output of +10 dbm, a band-width of from 8 to 100 kilocycles, and an input impedance of 600 ohms (within ±5 per cent over the carrier frequency range).

While the present invention has been described with reference to application in the carrier telephone field, it is not limited to such applications. Embodiments of the invention meet the rigid performance requirements required for carrier telephone use, but may be used generally in the transistor amplifier field.

What is claimed is:

1. A two-stage wide-band carrier frequency amplifier which comprises first and second junction transistors of like conductivity type each having an emitter electrode, a collector electrode, and a base electrode, a signal input circuit interconnecting the emitter and base electrodes of said first transistor, a signal output circuit interconnecting the collector and emitter electrodes of said second transistor, an interstage circuit interconnecting the collector electrode and the base electrode, respectively, of said first and second transistors and the base electrode and the emitter electrode, respectively, of said first and second transistors, a series negative feedback path between the emitter electrode of said second transistor and the base electrode of said first transistor, and a shunt negative feedback path between the collector electrode of said second transistor and the emitter electrode of said first transistor.

2. A two-stage wide-band carrier frequency amplifier which comprises first and second junction transistors of like conductivity type each having an emitter electrode, a collector electrode, and a base electrode, a signal input circuit for said amplifier interconnecting the emitter and base electrodes of said first transistor, a signal output circuit for said first transistor interconnecting the collector and base electrodes thereof, a signal input circuit for said second transistor interconnecting the base and emitter electrodes thereof, at least a portion of said signal output circuit for said first transistor being common to said signal input circuit for said second transistor, a signal output circuit for said amplifier interconnecting the collector and emitter electrodes of said second transistor, a series negative feedback path including a resistance and a capacitance connected in series between the emitter electrode of said second transistor and the base electrode of said first transistor, and a shunt negative feedback path including a resistance and a capacitance connected in series between the collector electrode of said second transistor and the emitter electrode of said first transistor.

3. A two-stage wide-band carrier frequency amplifier which comprises first and second junction transistors of like conductivity type each having an emitter electrode, a collector electrode, and a base electrode, a signal input circuit for said amplifier interconnecting the emitter and base electrodes of said first transistor, a signal output circuit for said first transistor interconnecting the collector and base electrodes thereof, a first resistance common to said amplifier signal input circuit and said first transistor signal output circuit, a signal input circuit for said second transistor interconnecting the base and emitter electrodes thereof, at least a portion of said signal output circuit for said first transistor being common to said signal input circuit for said second transistor, a signal output circuit for said amplifier interconnecting the collector and emitter electrodes of said second transistor, a second resistance common to said second transistor signal input circuit and said amplifier signal output circuit, a series negative feedback path in the form of a resistance and a capacitance connected in series between the side of said second resistance adjacent the emitter electrode of said second transistor and the side of said first resistance adjacent the base electrode of said first transistor, and a shunt feedback path in the form of a resistance and a capacitance connected in series between the collector electrode of said second transistor and the emitter electrode of said first transistor, whereby high gain is maintained over the entire frequency range of operation of the amplifier, said input circuit for said second transistor substantially matches the impedance of said signal output circuit for said first transistor, and possible singing difficulties due to increased phase shift through said transistors at the higher operating frequencies are avoided.

4. A two-stage wide-band carrier frequency amplifier which comprises first and second junction transistors of like conductivity type each having an emitter electrode, a collector electrode, a base electrode, and an alpha cut-off frequency substantially adjacent the upper end of the operating signal frequency band of said amplifier, a signal input circuit for said amplifier interconnecting the emitter and base electrodes of said transistor, a signal output circuit for said first transistor interconnecting the collector and base electrodes thereof, a signal input circuit for said second transistor interconnecting the base and emitter electrodes thereof, a signal output circuit for said amplifier interconnecting the collector and emitter electrodes of said second transistor, a direct interstage coupling connection between the collector electrode of said first transistor and the base electrode of said second transistor, a series negative feedback path in the form of a resistance and a capacitance connected in series between the emitter electrode of said second transistor and the base electrode of said first transistor, and a shunt negative feedback path in the form of a resistance and a capacitance connected in series between the collector electrode of said second transistor and the emitter electrode of said first transistor, said amplifier having total phase shifts from the base electrode of said first transistor to the emitter electrode of said second transistor and from the emitter electrode of said first transistor to the collector electrode of said second transistor that are each substantially removed from 360 degrees over the entire operating signal frequency band of said amplifier, whereby said amplifier is provided with both high gain and stability against self-oscillation over its entire said operating signal frequency band.

References Cited in the file of this patent

UNITED STATES PATENTS 2,541,322 Barney ---------------- Feb. 13, 1951

OTHER REFERENCES

Radio Engineering, pp. 311–326, published 1947.